United States Patent
Alumbaugh et al.

(10) Patent No.: US 9,377,556 B2
(45) Date of Patent: Jun. 28, 2016

(54) SYSTEMS AND METHODS FOR ELECTROMAGNETIC DETECTION OF A FORMATION ANOMALY FROM A NEAR BIT LOCATION WHILE DRILLING

(75) Inventors: David Alumbaugh, Berkeley, CA (US); Edward Nichols, Berkeley, CA (US); Cengiz Esmersoy, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1158 days.

(21) Appl. No.: 12/719,730

(22) Filed: Mar. 8, 2010

(65) Prior Publication Data
US 2010/0231220 A1 Sep. 16, 2010

Related U.S. Application Data

(60) Provisional application No. 61/160,056, filed on Mar. 13, 2009, provisional application No. 61/173,246, filed on Apr. 28, 2009.

(51) Int. Cl.
*G01V 3/00* (2006.01)
*G01V 3/30* (2006.01)
*E21B 7/04* (2006.01)
(Continued)

(52) U.S. Cl.
CPC ... *G01V 3/30* (2013.01); *E21B 7/04* (2013.01); *E21B 44/00* (2013.01); *G01V 1/00* (2013.01); *G01V 3/00* (2013.01); *G01V 2210/00* (2013.01)

(58) Field of Classification Search
CPC .............. G01V 1/00; G01V 3/00; G01V 5/00; G01V 9/00; G01V 11/00; G01V 2003/00; G01V 2200/00; G01V 2210/00
USPC ............. 324/338; 166/250.01, 250.15, 254.1, 166/65.1, 113, 64
See application file for complete search history.

(56) References Cited

U.S. PATENT DOCUMENTS 2,746,009 A * 5/1956 McLaughlin et al. ........ 324/339
3,391,334 A * 7/1968 Ruehle .......................... 324/344
(Continued)

FOREIGN PATENT DOCUMENTS

WO 2005085909 A1 9/2005

OTHER PUBLICATIONS

Abubakar et al., "2.5D forward and inverse modeling for interpreting low-frequency electromagnetic measurements," Geophysics v. 73, No. 4, pp. F165-F177 (Jul.-Aug. 2008).
(Continued)

*Primary Examiner* — Huy Q Phan
*Assistant Examiner* — Temilade Rhodes-Vivour
(74) *Attorney, Agent, or Firm* — Michael Dae

(57) ABSTRACT

A drill string is disposed in the borehole having a BHA and a drill bit advancing the borehole. Among other BHA components, including a telemetry unit and a data acquisition unit, in a surface-to-borehole configuration a receiver (or receiver array) is positioned immediately proximate the drill bit in the borehole, while a source (or source array) is positioned at the Earth's surface. Alternatively, in a borehole-to-surface configuration the source may be positioned immediately proximate the drill bit in the borehole while a receiver (or receiver array) is positioned at the surface. The surface-to-borehole, or borehole-to-surface, system enables an electromagnetic look about while drilling operations are underway.

36 Claims, 15 Drawing Sheets

(51) Int. Cl.
*E21B 44/00* (2006.01)
*G01V 1/00* (2006.01)

(56) References Cited

U.S. PATENT DOCUMENTS

| | | | | |
|---|---|---|---|---|
| 4,323,848 | A * | 4/1982 | Kuckes | 324/338 |
| 4,502,010 | A * | 2/1985 | Kuckes | 324/338 |
| 5,597,042 | A | 1/1997 | Tubel | |
| 5,662,165 | A | 9/1997 | Tubel | |
| 5,886,255 | A | 3/1999 | Aronstam | |
| 5,892,362 | A * | 4/1999 | Warren et al. | 324/339 |
| 6,781,520 | B1 * | 8/2004 | Smith et al. | 340/853.1 |
| 2002/0166973 | A1 * | 11/2002 | Frederick | E21C 35/24 250/361 R |
| 2003/0038634 | A1 * | 2/2003 | Strack | G01V 11/00 324/323 |
| 2005/0165555 | A1 * | 7/2005 | Jackson | 702/16 |
| 2005/0285598 | A1 * | 12/2005 | Barringer | 324/330 |
| 2007/0061080 | A1 * | 3/2007 | Zhdanov | 702/7 |
| 2007/0256829 | A9 * | 11/2007 | Hosie et al. | 166/250.01 |
| 2007/0280047 | A1 * | 12/2007 | MacGregor et al. | 367/15 |
| 2007/0285274 | A1 * | 12/2007 | Esmersoy | E21B 21/08 340/853.5 |
| 2008/0290873 | A1 * | 11/2008 | Homan et al. | 324/337 |
| 2009/0237083 | A1 * | 9/2009 | Ostermeier et al. | 324/338 |
| 2010/0109672 | A1 * | 5/2010 | Rabinovich et al. | 324/338 |
| 2010/0155138 | A1 * | 6/2010 | Kuckes | 175/45 |

OTHER PUBLICATIONS

Hoversten et al., "Integration of multiple electromagnetic and inversion techniques for prospect evaluation," SEG Expanded Abstracts, v. 25, pp. 719-723 (2006).

* cited by examiner

SYSTEMS AND METHODS FOR ELECTROMAGNETIC DETECTION OF A FORMATION ANOMALY FROM A NEAR BIT LOCATION WHILE DRILLING

CROSS-REFERENCE TO RELATED APPLICATIONS

This application claims the benefit under 35 U.S.C. §119(e) of U.S. Provisional Application Ser. No. 61/160,056, entitled "Electromagnetic Detection of Base of Salt while Drilling," filed Mar. 13, 2009 and of U.S. Provisional Application Ser. No. 61/173,246, entitled "Electromagnetic Detection of Base of Salt while Drilling," filed Apr. 28, 2009, which are hereby incorporated by reference. This application is related to U.S. application Ser. No. 12/603,053, entitled "Electromagnetic Logging Between Borehole and Surface," filed Oct. 21, 2009.

TECHNICAL FIELD

The invention relates generally to systems and methods for measuring electromagnetic fields immediately proximate behind the drill bit to determine the position of a salt base relative to the measurement location for detecting the location of salt ahead of the drill bit.

BACKGROUND

The use of surface to borehole electromagnetic (EM) methods has a long history in the mining industry. In general, such techniques use a man-made EM source located at the surface of the Earth, with measurements made of various EM components downhole. Compared to surface-only survey methods, surface to borehole techniques offer improved resolution at depth in the region of the borehole. To date, known surface-to-borehole methods generally have described measurements made after a borehole has already been drilled, rather than during the drilling process, and are generally directed to reservoir characterization post-drilling for applications such as fluid front monitoring and production monitoring and control. A borehole-to-surface survey geometry, such as that described in U.S. patent application Ser. No. 12/603,053, filed Oct. 21, 2009 incorporated herein by reference in its entirety, is also known for measurements made after a borehole has been drilled.

For example, WO2005085909 entitled "Combined surface and borehole electromagnetic measurement system and method for determining formation fluid properties" to Strack describes surface-to-borehole survey measurements post-drilling for monitoring the movement of fluid in the reservoir. U.S. Pat. No. 5,886,255 to Aronstam describes seismic borehole sensors for production monitoring when drilling is complete. U.S. Pat. No. 5,597,042 and U.S. Pat. No. 5,662,165, both to Tubel et al., describe permanently installed sensors of various types for reservoir monitoring and production control when drilling is complete.

It is highly desirable to detect formation characteristics ahead of and/or about the drilling apparatus while drilling is proceeding, so as to avoid problems arising from entering an over-pressurized zone, problems arising from crossing faults and bed boundaries, and the like. However, known while drilling look-ahead and/or look-around do not detect formation anomalies at a sufficient time and distance ahead of the bit or BHA with an acceptable spatial resolution and depth of investigation. Additionally, the complex inversion methods described in related art for reservoir characterization, fluid monitoring and production control are not suitable for the while-drilling applications proposed here, given that the computational complexity and time required to complete them would not enable an answer in time to avoid the problems described above.

One specific pressing problem experienced during drilling of a petroleum well is detecting the base of salt bodies prior to exiting. Sediment below a salt body can be over-pressured, a condition that leads to blow outs and other dangerous situations if the drill rig and controls are not set up to accommodate excess pressure. As such, accurately and quickly detecting salt bodies well ahead of the drill bit during drilling is highly valued.

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

The following terms have a specialized meaning in this disclosure. While many are consistent with the meanings that would be attributed to them by a person having ordinary skill in the art, the meanings are also specified here.

Figure 1:
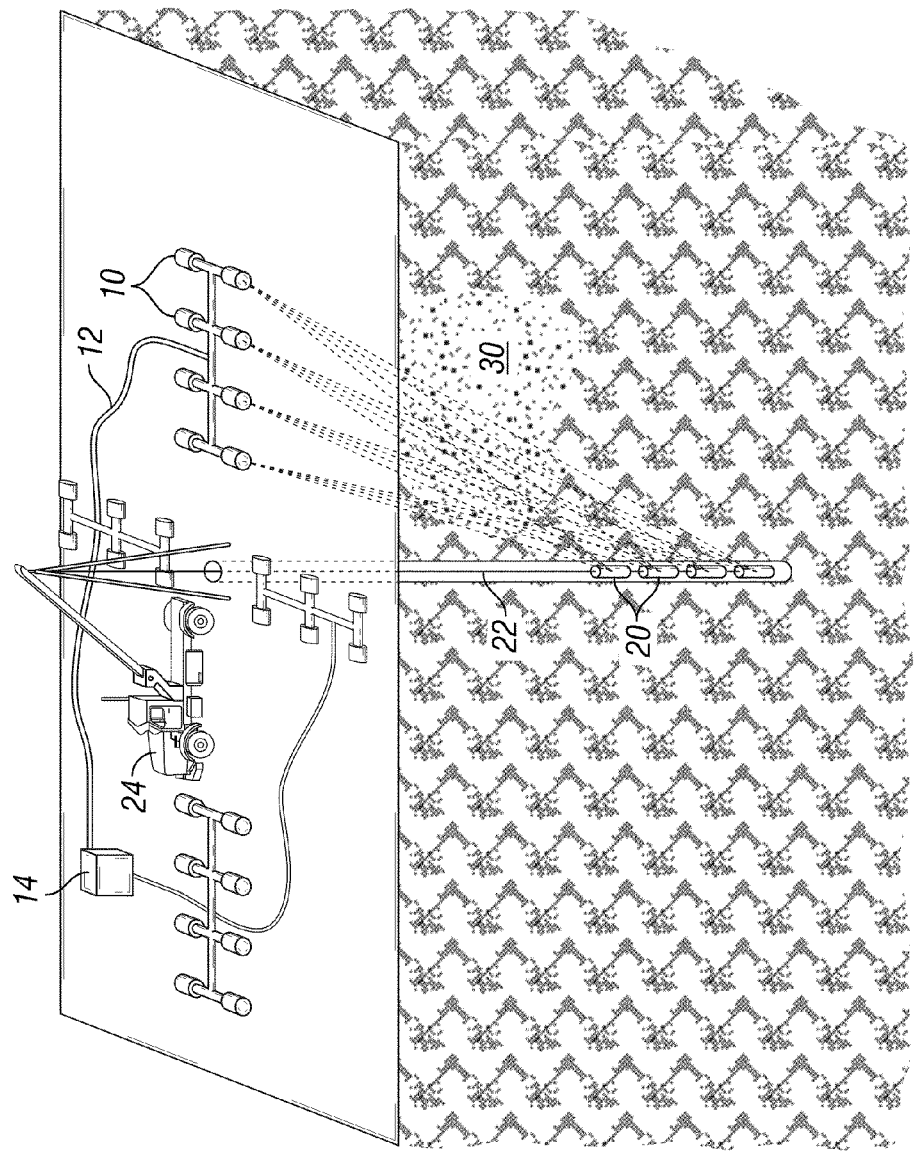
FIG. 1 shows a prior art surface-to-borehole survey geometry for reservoir characterization and monitoring when drilling is complete.
Figure 2:
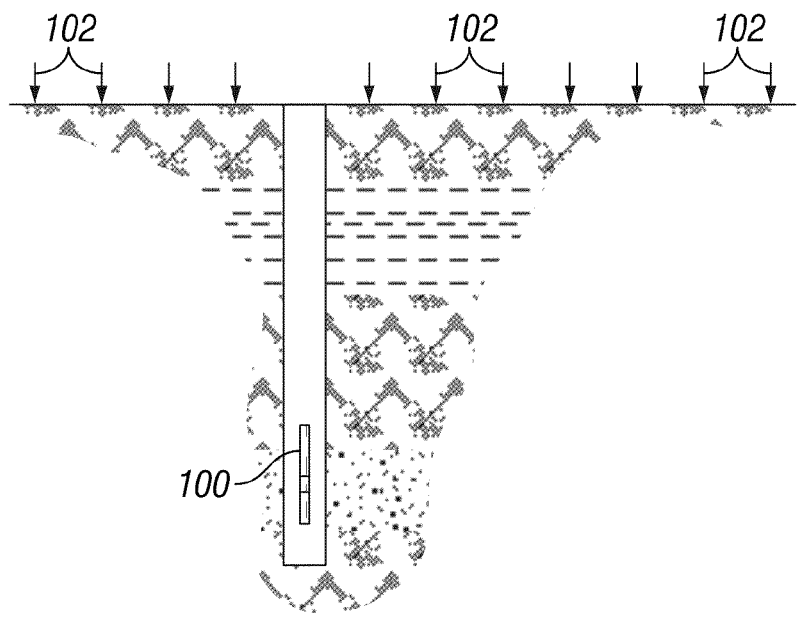
FIG. 2 shows a prior art borehole-to-surface survey geometry for reservoir characterization and monitoring when drilling is complete.

FIG. 1 shows a prior art surface-to-borehole survey geometry, that is, an EM induction survey in which one or more EM transmitters are placed at or near the earth surface (e.g., land surface or sea floor) or towed in a body of water (for marine surveying), or towed in air above the surface (for air-borne surveying), and one or more EM receivers are placed in a borehole to detect EM signals transmitted by the EM transmitter(s) and affected by the subterranean formation between the earth surface and the borehole. FIG. 2 shows a prior art borehole-to-surface survey, that is, an EM induction survey in which one or more EM transmitters are placed in a borehole and one or more EM receivers are placed near the surface to detect EM signals transmitted by the EM transmitter(s) and affected by the subterranean formation between the earth surface and the borehole. In either geometry, the number of receivers employed may vary, as an array in the borehole or on the surface, respectively. The receiver(s) may include hardware used to correct the signal received for attenuation caused by the casing.

Figure 3:
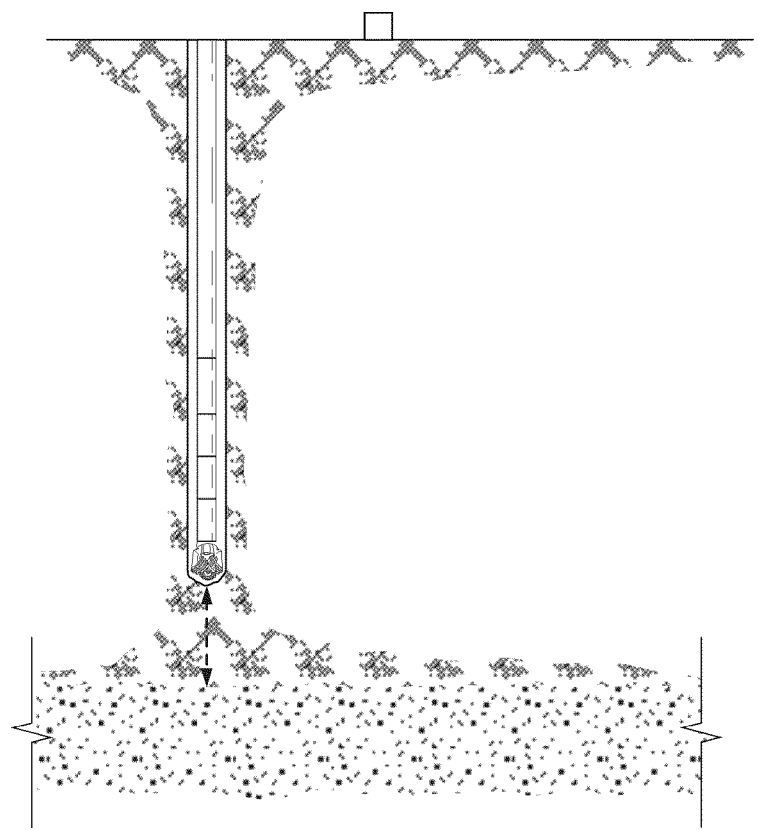
FIG. 3 illustrates a while-drilling look-ahead configuration in accordance with embodiments of the present disclosure.

FIG. 3 shows a while-drilling look-ahead configuration in accordance with embodiments of the present disclosure. A drill string is disposed in the borehole having a BHA and a drill bit advancing the borehole. Among other BHA components, including a telemetry unit and a data acquisition unit, in a surface-to-borehole configuration a receiver (or receiver array) is positioned proximate the drill bit in the borehole, while a source (or source array) is positioned at the Earth's surface. Alternatively, in a borehole-to-surface configuration the source may be positioned proximate the drill bit in the borehole while a receiver (or receiver array) is positioned at the surface. Surface equipment, not shown, is operable to receive measurements acquired at the downhole receiver (or source), transferred via a telemetry unit (employing any of various while drilling telemetry methods, including but not limited to mud pulse telemetry, electromagnetic telemetry, acoustic telemetry, and/or wired drill pipe). The data acquisition unit processes the raw measurements into a signal transferable to the surface equipment via the telemetry unit, and optionally, may even perform the analysis described below. Alternatively, the surface equipment may be configured to perform the analysis described below.

One of ordinary skill in the art should recognize that the present disclosure may extend to marine applications, in which single or multiple EM sources are deployed near the seafloor at some distance away from the drilling platform where the borehole is being drilled. Alternatively, the present disclosure may also extend to land drilling operations whereby the source is located on or near the Earth's surface. The source could additionally be flown or towed. For borehole-to-surface geometries, the same would apply for the receiver.

The source(s) can be either an electric source where by a static or time-varying current is injected into the earth/seawater through two electrodes, a magnetic source where the time varying current flows in a loop of wire or solenoid, or a combination of both. Such sources can transmit a low frequency EM signal consisting of any number of periodic waveforms including a repeated impulse, a sine wave, a square wave, or a limited duty-cycle square wave where by the signal is on for some period of time and then off for some time. In addition, for the electric source, the signal can be a steady-state or DC current.

A receiver unit is located on the drill string just above the drill bit in the surface-to-borehole geometry. In a most general sense, the receiver can measure between one to three components of the electric field, and/or one to three components of the magnetic field. The electric field component measurements could be made either by simply measuring voltages between two electrodes, by measuring currents between two metal plates as outlined in U.S. Pat. No. 7,633, 296 to Safinya et al. (commonly assigned with the present application, and incorporated herein by reference in its entirety), or by similarly employing toroidal coils. The magnetic field measurements could involve the use of induction coils or fluxgate magnetometers, or other magnetic field measuring devices including total field magnetometers. The measurements can either be made while the drill string is turning during drilling, or while it is temporarily stopped, for instance, while a new section of drill-string is added. Measuring while drill string is temporarily still would provide better quality measurements. The resulting measurements of electric and/or magnetic field can then be sent to the surface via any on various telemetry techniques as noted above.

After the measurement has been received at the surface, the data will be analyzed in real time to determine how close the drill bit is to the base of salt. This will involve basic data processing and component rotation which may be done automatically. Next simplified data analysis techniques to determine how fast various components are changing from one depth to the next, model matching involving either simple 1D models or precomputed 2D/3D models, and/or quick imaging/inversion techniques will be applied. The end result will be an estimate of distance between the drill bit and the salt-exit point that will allow drill operators to better prepare for the possibility of over-pressured conditions. In some embodiments, however, it is contemplated that analogous downhole analysis is also feasible.

More specifically, the analysis consists of two primary steps, however, one of ordinary skill in the art could envision additional methods of data processing and analysis that provide a real-time answer, and the following examples are not intended to be exclusive or limiting.

First, basic data processing and component rotation is applied. This step may or may not occur automatically. Basic data quality control analysis, signal conditioning, filtering and stacking, as well as measurement rotation and orientation are included.

The data analysis to estimate the distance and direction from the drill bit to the formation anomaly (such as a salt interface such as a salt entrance or a salt exit) can be performed in a number of ways, depending on the complexity of the scenario. The data analysis may consist of simple data analysis that derives the distance to the formation anomaly based on how rapidly the fields are changing with depth. This type of analysis would involve model studies ahead of time to determine theoretically how fast fields should change under given conditions, such that the analysis would be a simple comparison of the speed of field changes over depth to the models.

Similarly, model matching involving pre-computed 1D, 2D or 3D models could be employed for the second data analysis step. Such models would be derived from other geological and geophysical data, particularly seismic data as well as imaging results from other Controlled Source EM (CSEM) or Magnetotelluric (MT) surveys. An inversion approach employs numerical techniques to iteratively find an electromagnetic property model that produces results that fit the data. Two possible approaches include a pixel based approach described in "2.5D forward and inverse modeling for interpreting low-frequency electromagnetic measurements" by Abubakar et al., GEOPHYSICS, VOL. 73, NO. 4 JULY-AUGUST 2008; P. F165-F177 (incorporated herein by reference in its entirety), or a sharp boundary approach, described in "Integration of multiple electromagnetic imaging and inversion techniques for prospect evaluation" by Hoversten et al., SEG Expanded Abstracts, 25, 719-723 (incorporated herein by reference in its entirety). Both a pixel based approach and a sharp boundary approach benefit from starting models derived from analyses of data provided from pre-drilling EM surveys.

Figure 4B:
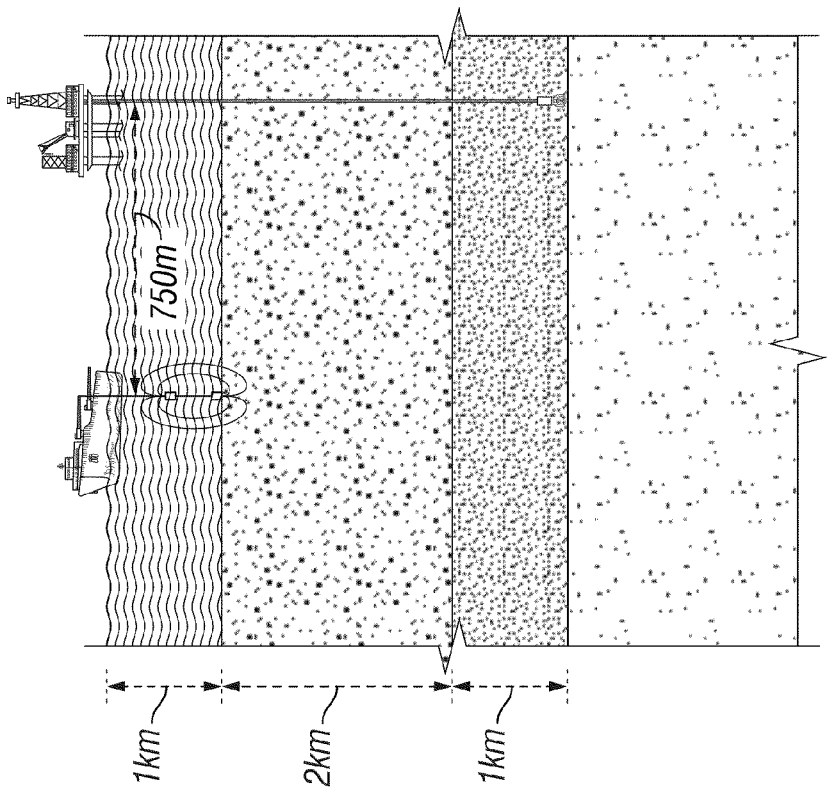
FIG. 4 shows an illustrative source-receiver configuration and salt base model for a marine while-drilling scenario in accordance with an embodiment of the present disclosure.
Figure 4A:
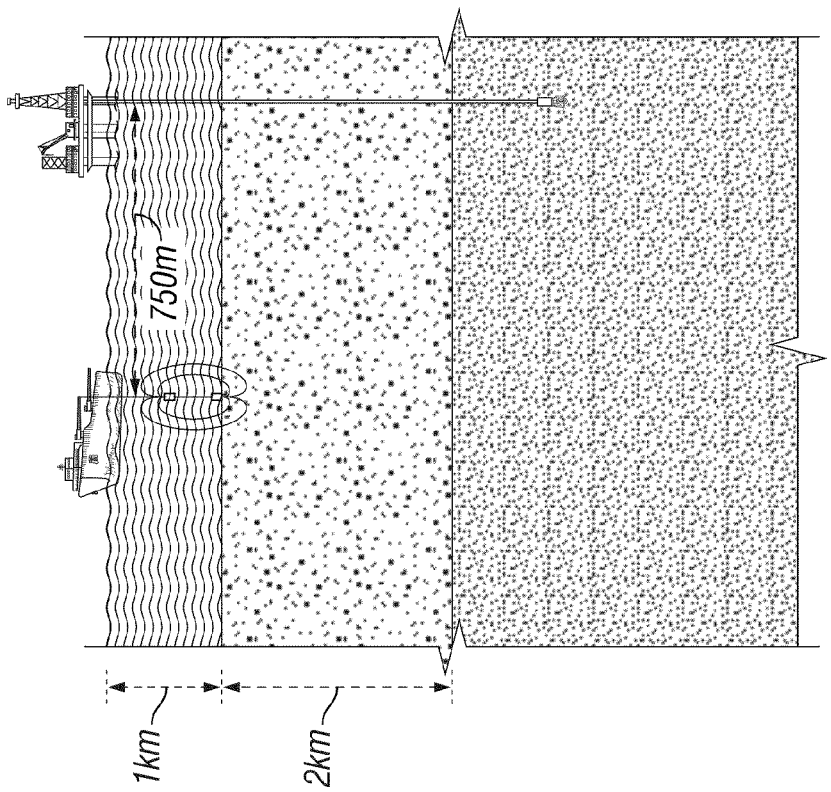
Figure 5A:
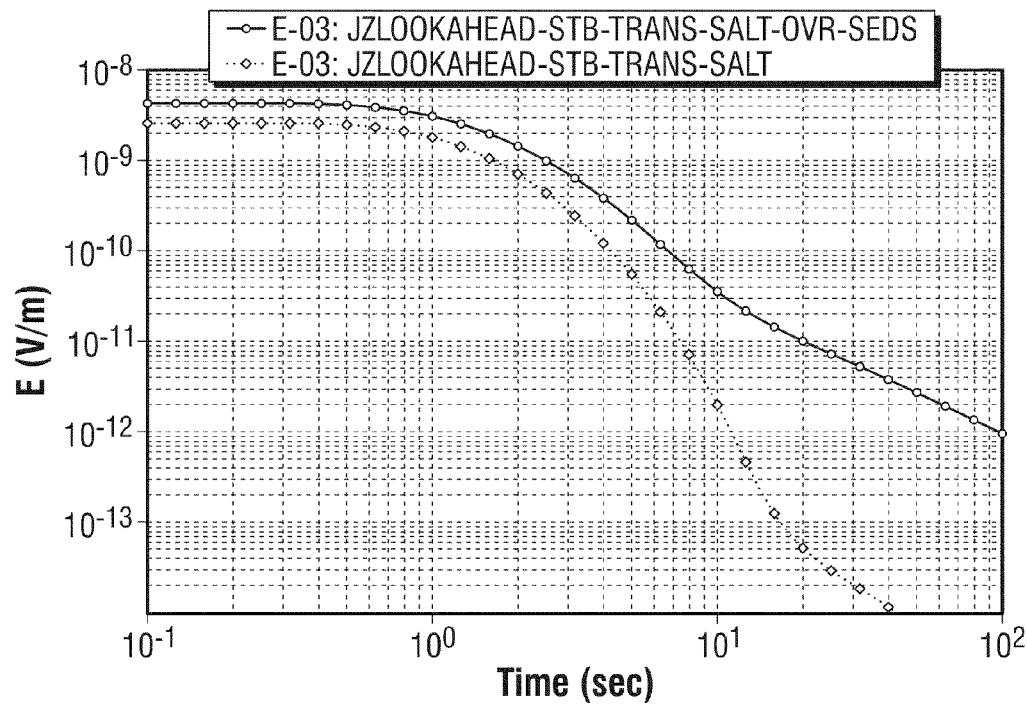
FIG. 5 graphs the vertical electric field measured at six different depths for the configuration of FIG. 4.
Figure 5B:
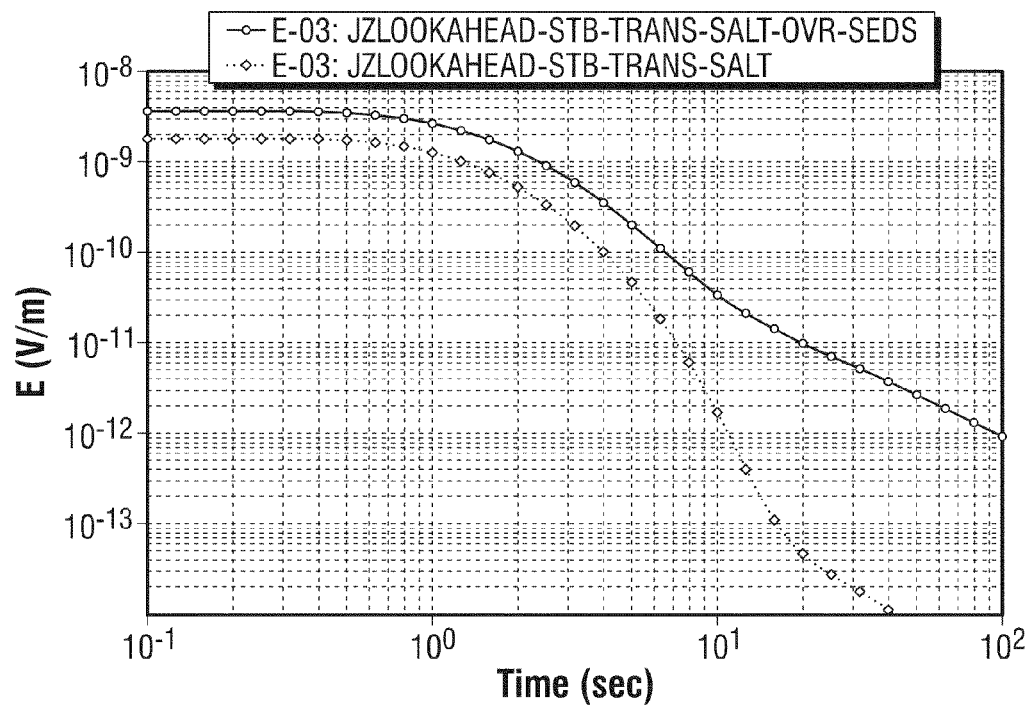
Figure 5C:
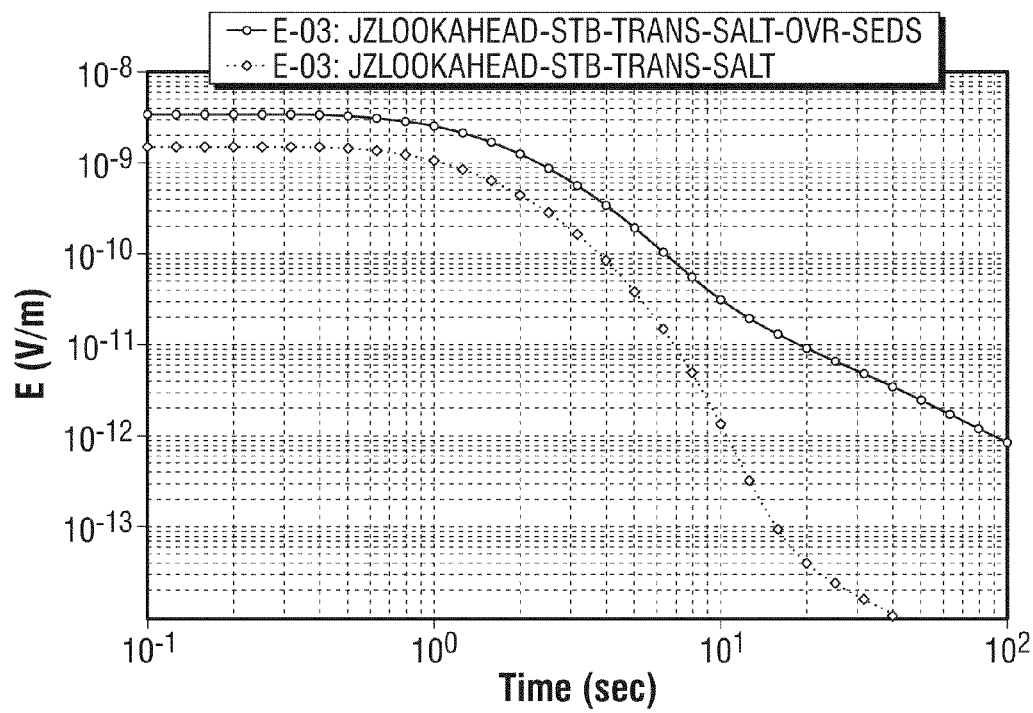
Figure 5D:
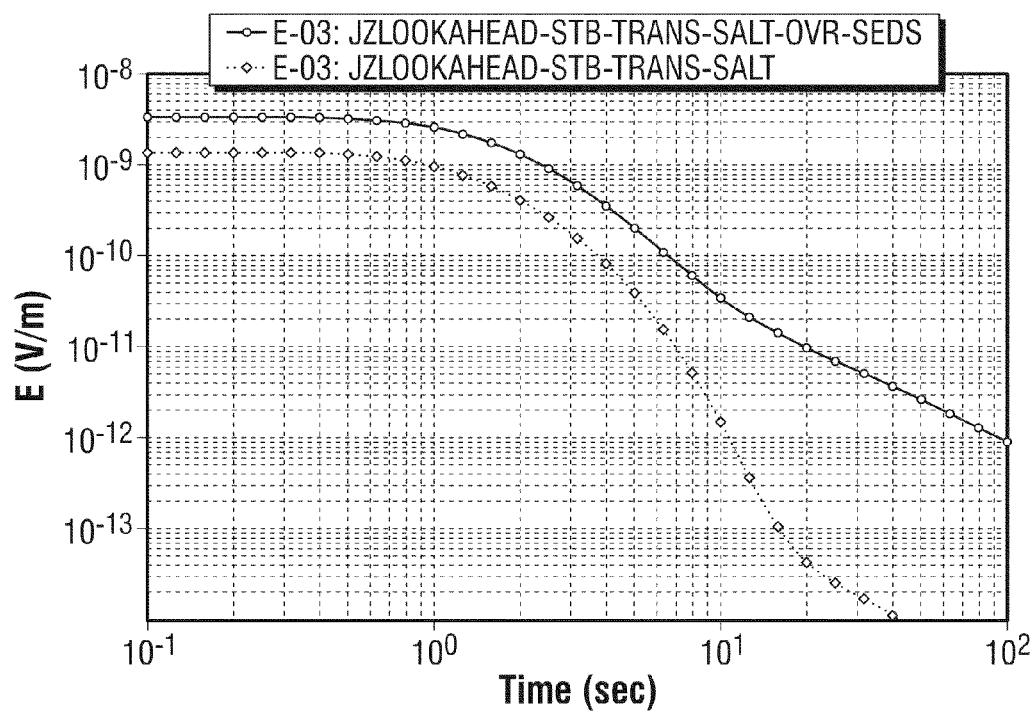
Figure 5E:
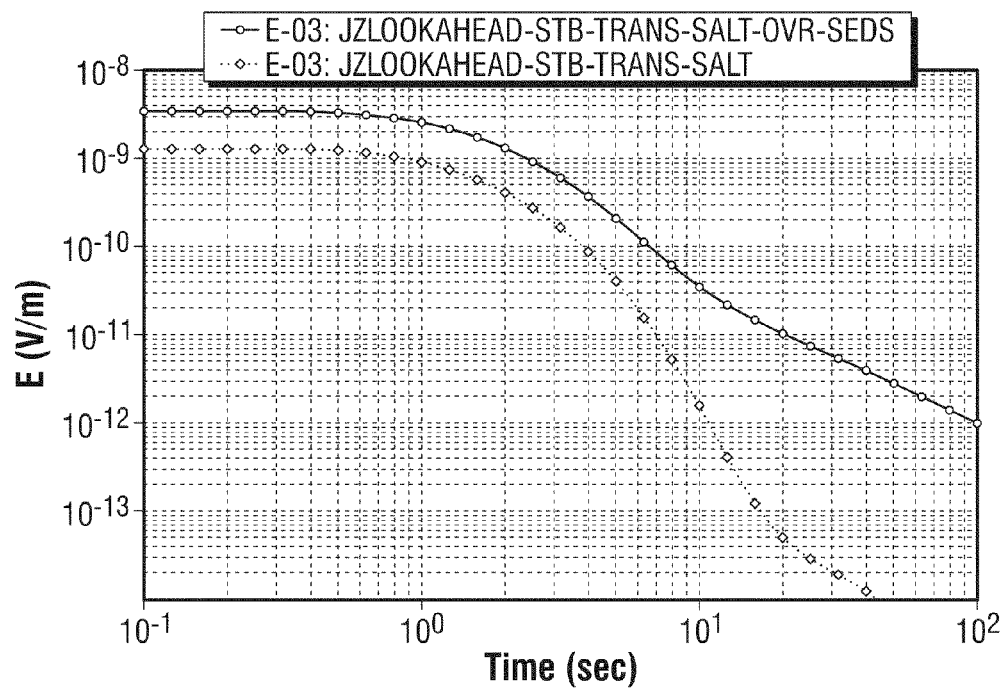
Figure 5F:
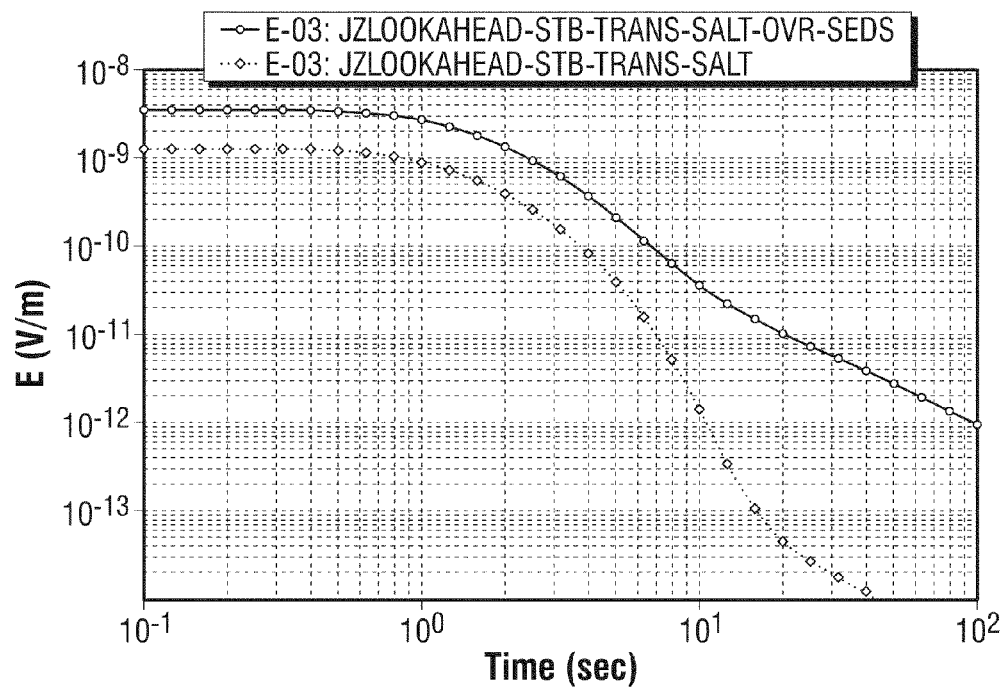
Figure 6A:
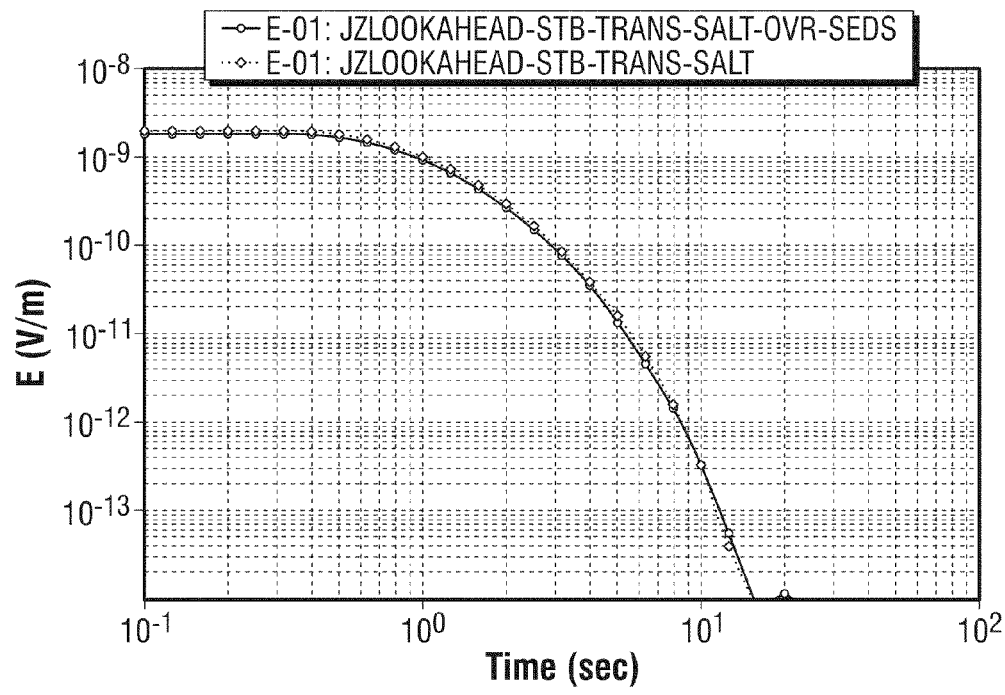
FIG. 6 graphs the horizontal field response to the vertical electric dipole source for the configuration of FIG. 4.
Figure 6B:
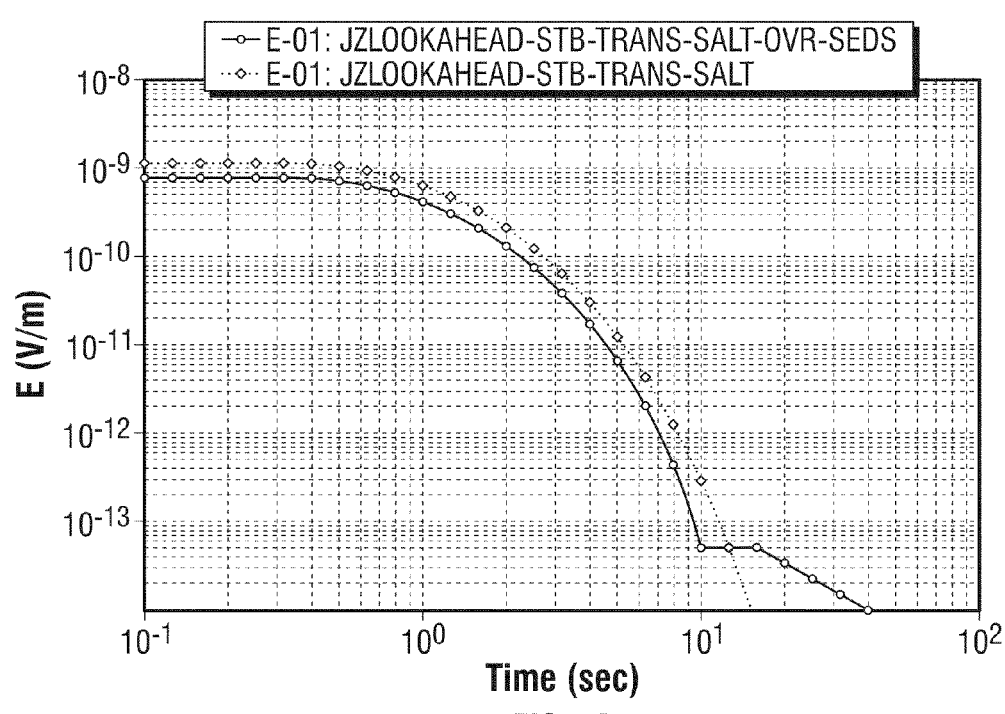
Figure 6C:
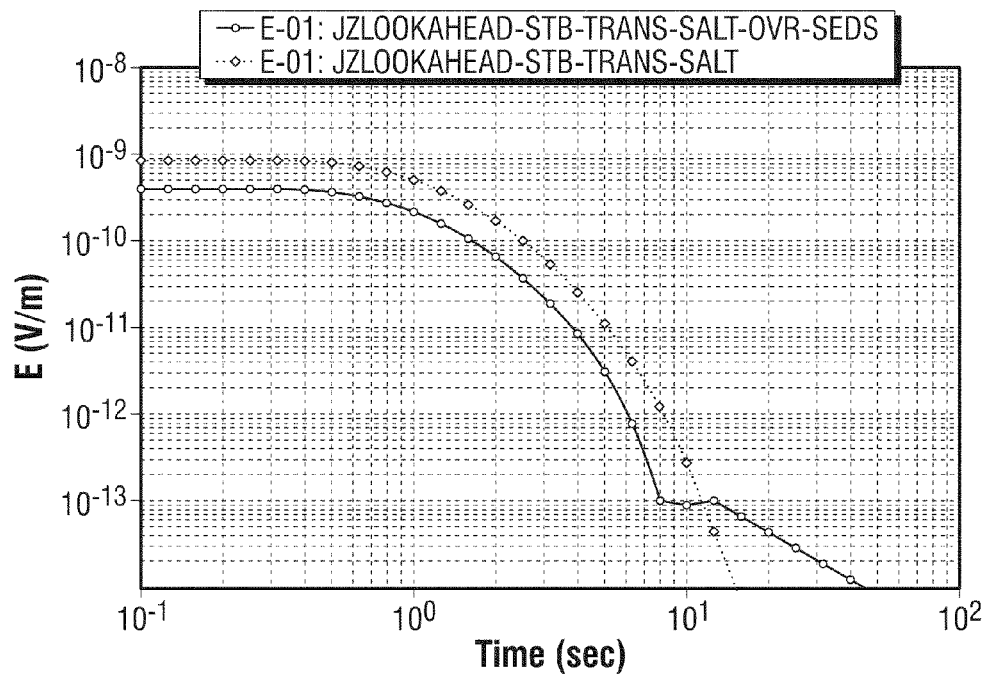
Figure 6D:
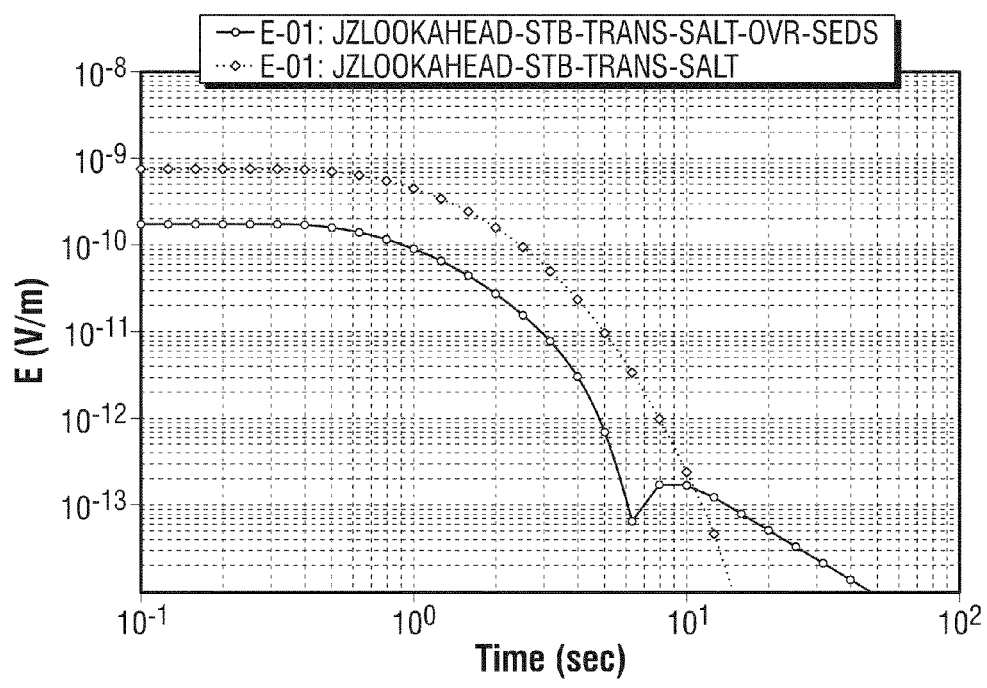
Figure 6E:
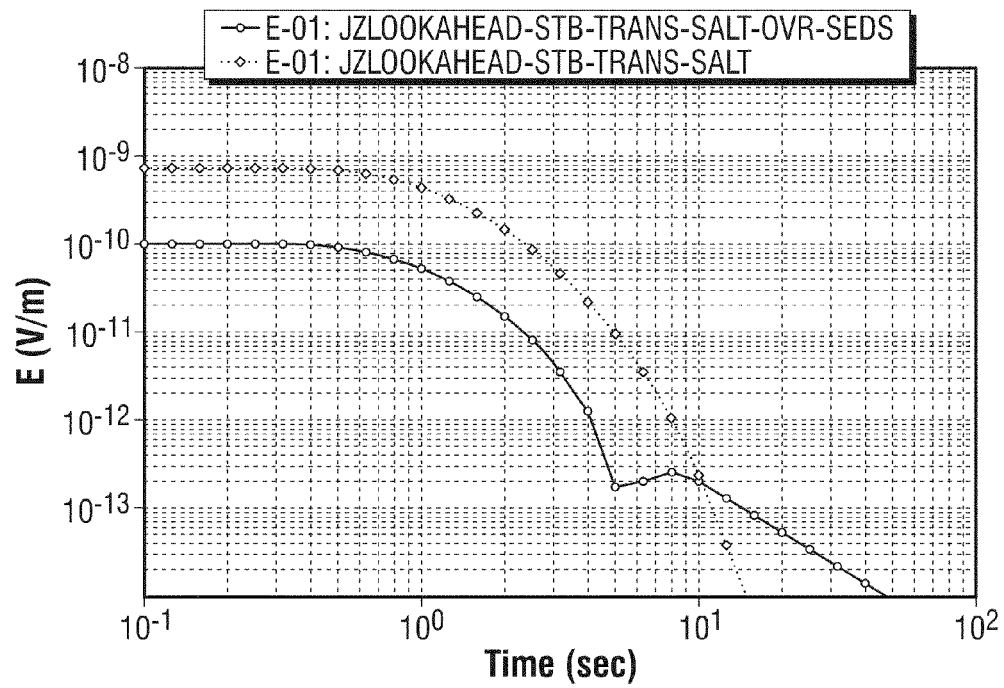
Figure 6F:
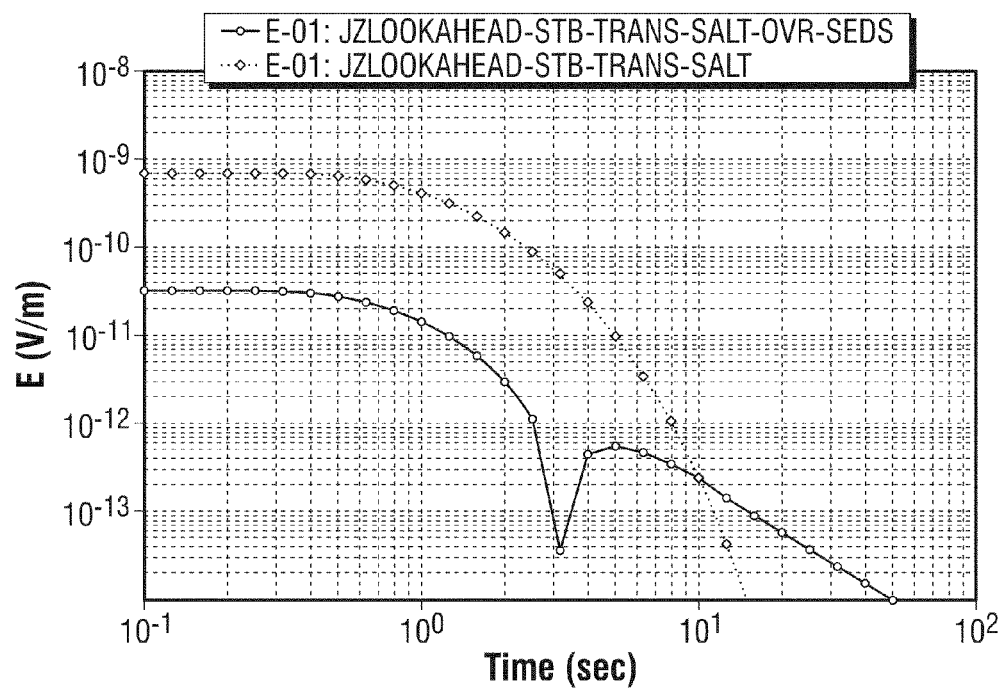
Figure 7A:
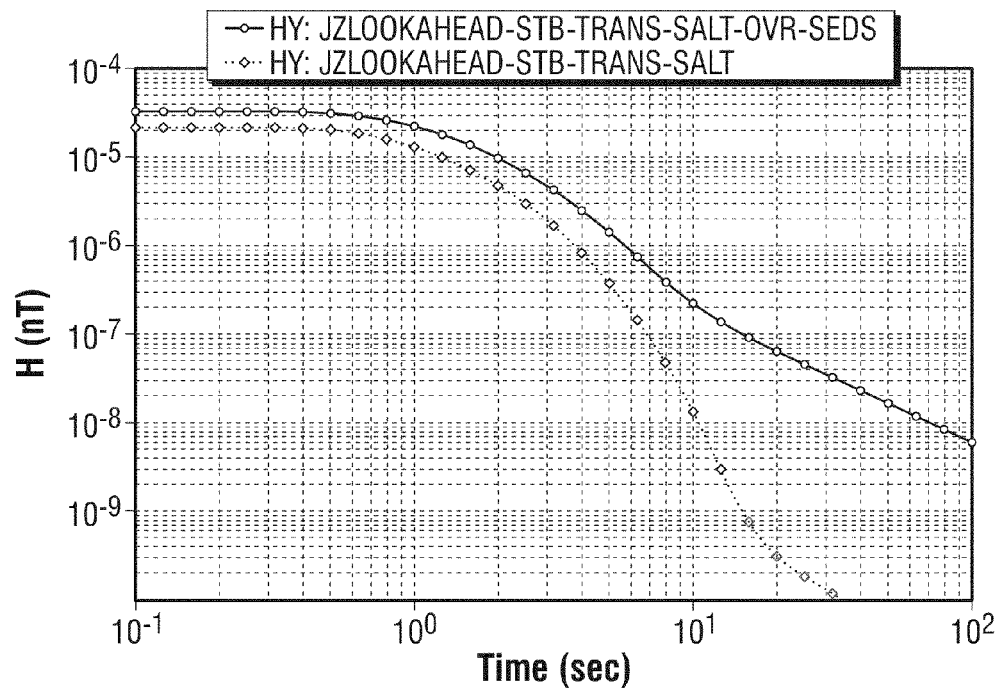
FIG. 7 shows the total field magnetic field response for the two models for the configuration of FIG. 4.
Figure 7B:
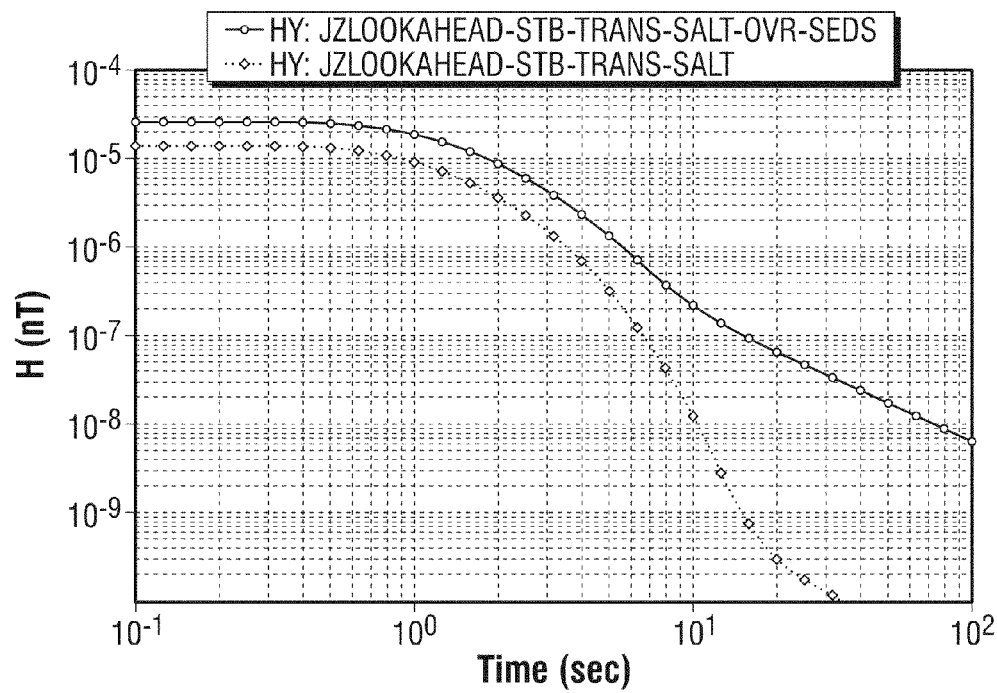
Figure 7C:
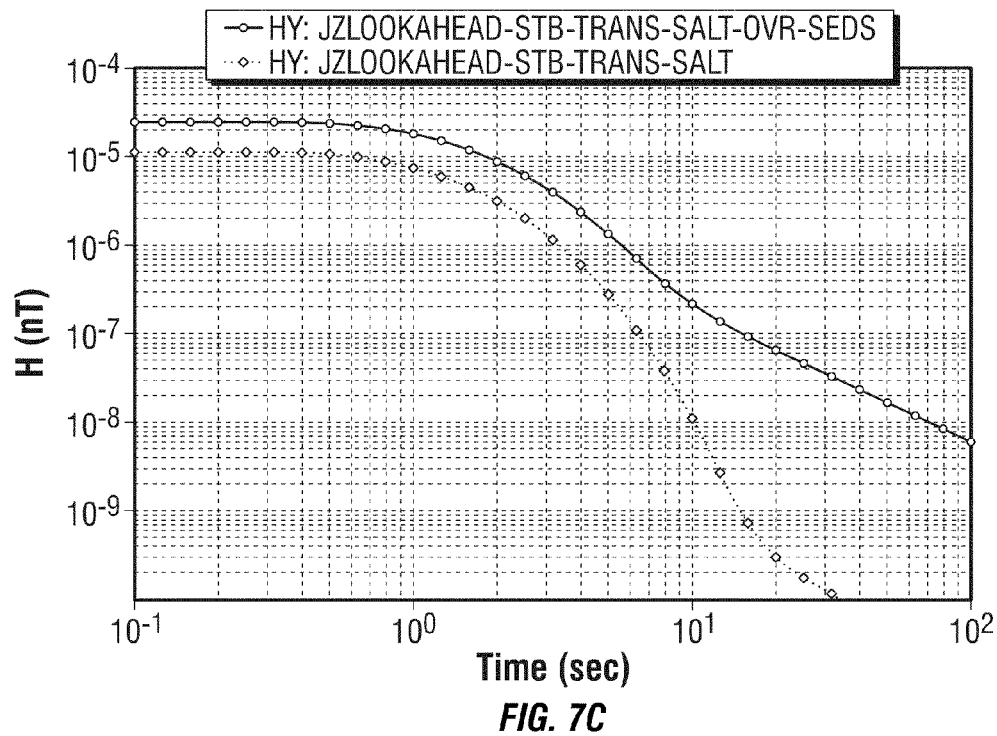
Figure 7D:
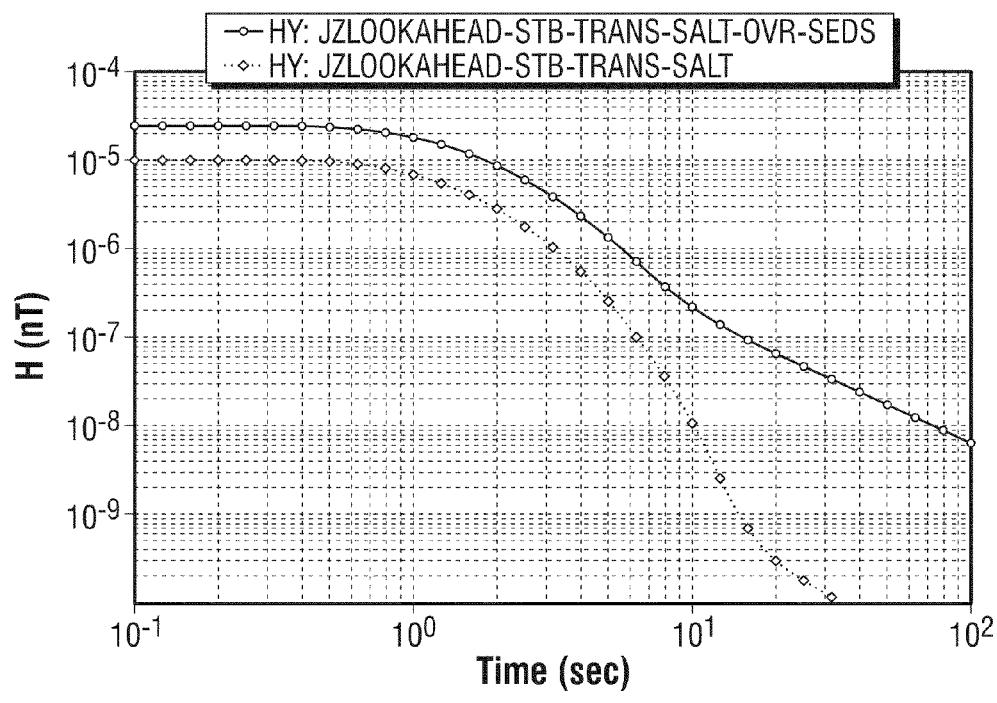
Figure 7E:
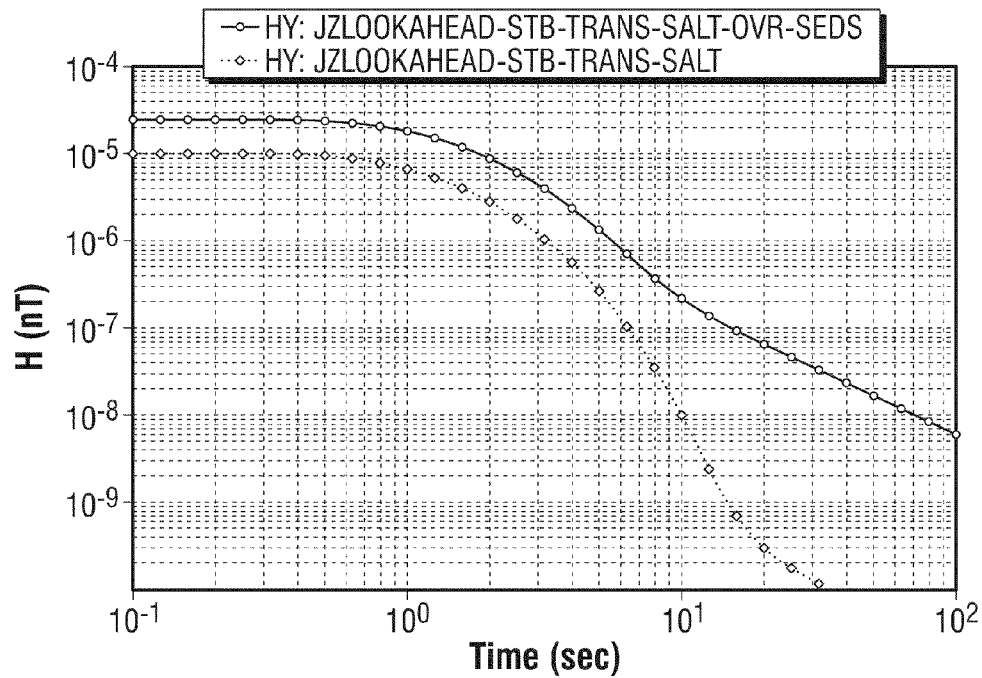
Figure 7F:
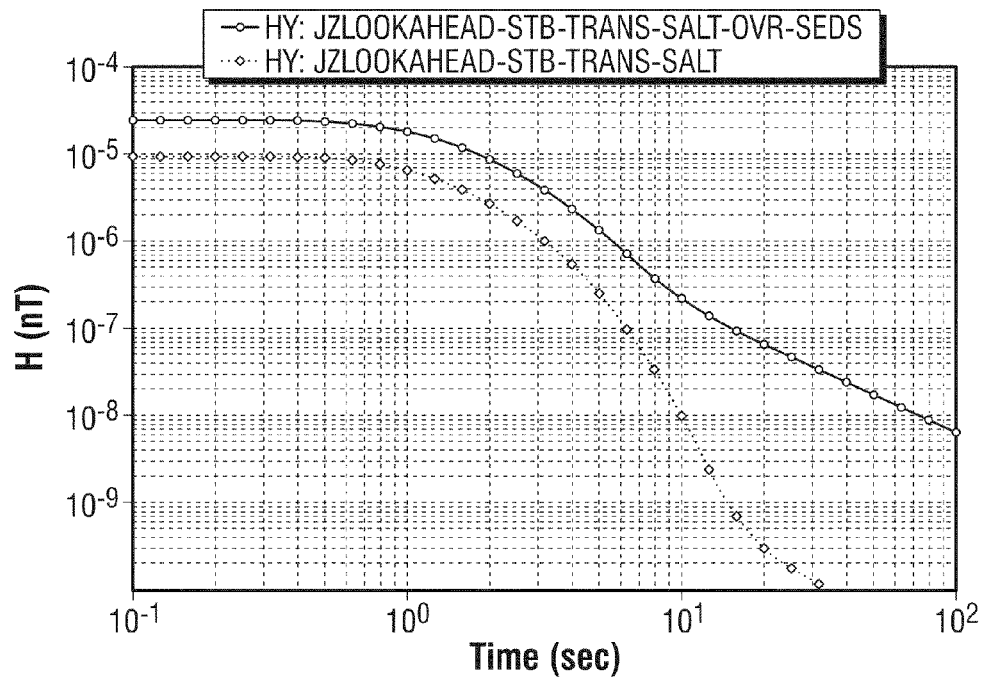

A modeling study will serve to demonstrate the invention. The models under consideration are shown in FIG. 4 and simulate a salt layer of resistivity 100 Ωm at 2 km depth overlain by 1 Ωm sediments. The seawater is 1 km deep. In the first case (left hand figure) the salt extends to infinity, while on the right hand side the salt is only 1 km thick, and is underlain by 2 Ωm sediments. The source is a vertical electrical dipole source with one electrode at the ocean bottom and the second 500 m above. The time varying electric field response to a step-off of current in the source was calculated using a semi-analytic one-dimensional solution. Note that this configuration is just one of many source-receiver configurations that could be employed in this invention.

FIG. 5 shows the vertical electric field measured at six different depths. The circles represent the response with the sediments underlying the salt, while the diamonds represent the response of the salt extending downward to infinity. FIG. 5 indicates that the Ez fields show a difference between the two models responses at early times, and even a greater difference at late times. In addition, as the measurement position moves deeper there is increasing separation between the two indicating additional sensitivity between the two models as the sensor gets closer to the base-of salt. However the differences are not as significant as the receiver approaches the boundary (2920, 2960 and 3000 m depth). This indicates that the vertical component has limited sensitivity as the receiver approaches the boundary.

FIG. 6 shows the horizontal field response to the vertical electric dipole source. Towards the top of the salt body (i.e. 2200 m below the seafloor) there is very little difference between the two model responses indicating small sensitivity to the base-of-salt. However as the depth of the receiver increases, a separation between the two responses quickly increases, especially as the receiver nears the base of salt. This indicates that for this source-receiver configuration the horizontal component is much more sensitive to the location of the base-salt than the vertical. This also demonstrates a need for making multi-component measurements.

To demonstrate that the magnetic fields also have some sensitivity to the base of salt, FIG. 7 shows the total field magnetic field response for the two models. Note that these responses look similar to that of the vertical electric field.

Figure 8B:
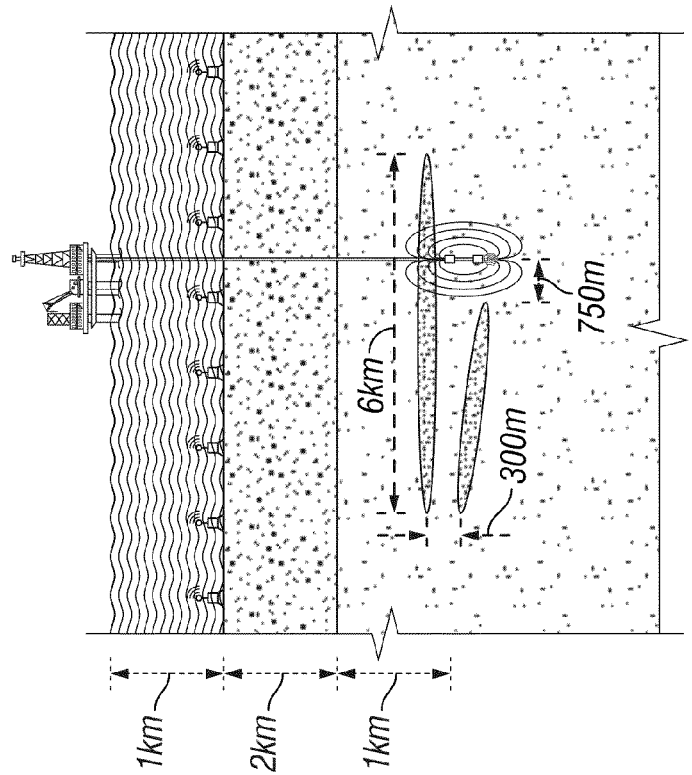
FIG. 8 shows an illustrative borehole-to-surface source-receiver configuration for a second scenario in accordance with an embodiment of the present disclosure.
Figure 8A:
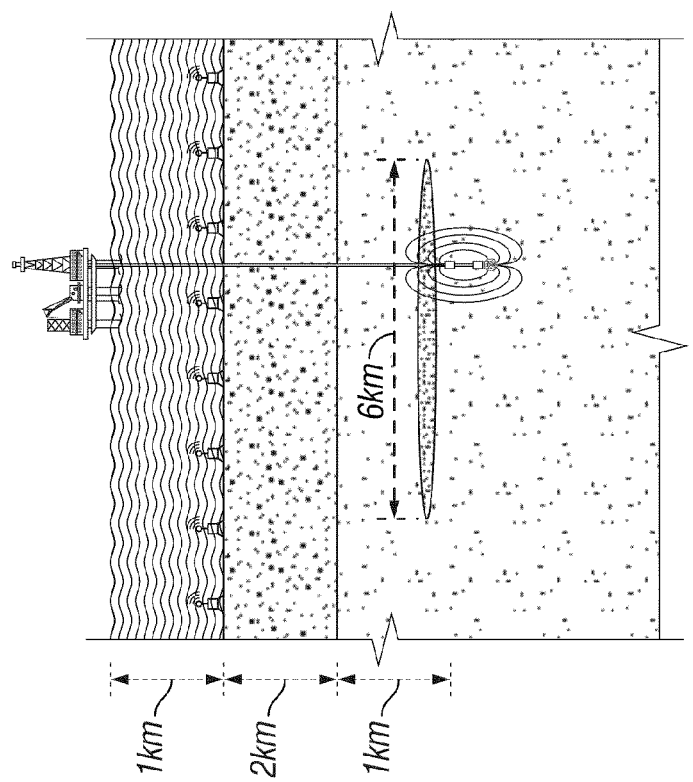

Note that in each of the model results there is a difference in the low frequency, or DC, asymptotic response. This suggests that if because of noise, sensor response or measurements time considerations, the full transient measurements are not practical for implementation, even a DC response can be practically measured to delineate a base of salt. A different example of look-ahead, or more appropriately, look about or look-to-the-side technology is shown in FIG. 8. As shown in FIG. 8, a well has intersected a reservoir at 2 km depth below the sea floor (3 km below sea-surface) but is to the side of a hypothesized second reservoir. Thus a question arises: does the second reservoir exist, such as shown in the right hand side of the figure, or is it absent as shown in the left hand side? In this example, an electric source such as Schlumberger's E-Pulse™ source is placed just above the drill bit, and measurements of the horizontal electric fields made by seafloor receivers similar to those currently used by WesternGeco EM. The most notable difference in the receivers is that the receivers employ real time communication with the drilling platform which could be provided by acoustic transmission through the seawater, wire connection to a communication buoy, or some other technology. The data could also be collected using a seafloor-to-borehole type scenario such as described previously for the original base-of-salt detection patent memo.

Figures 9, 10:
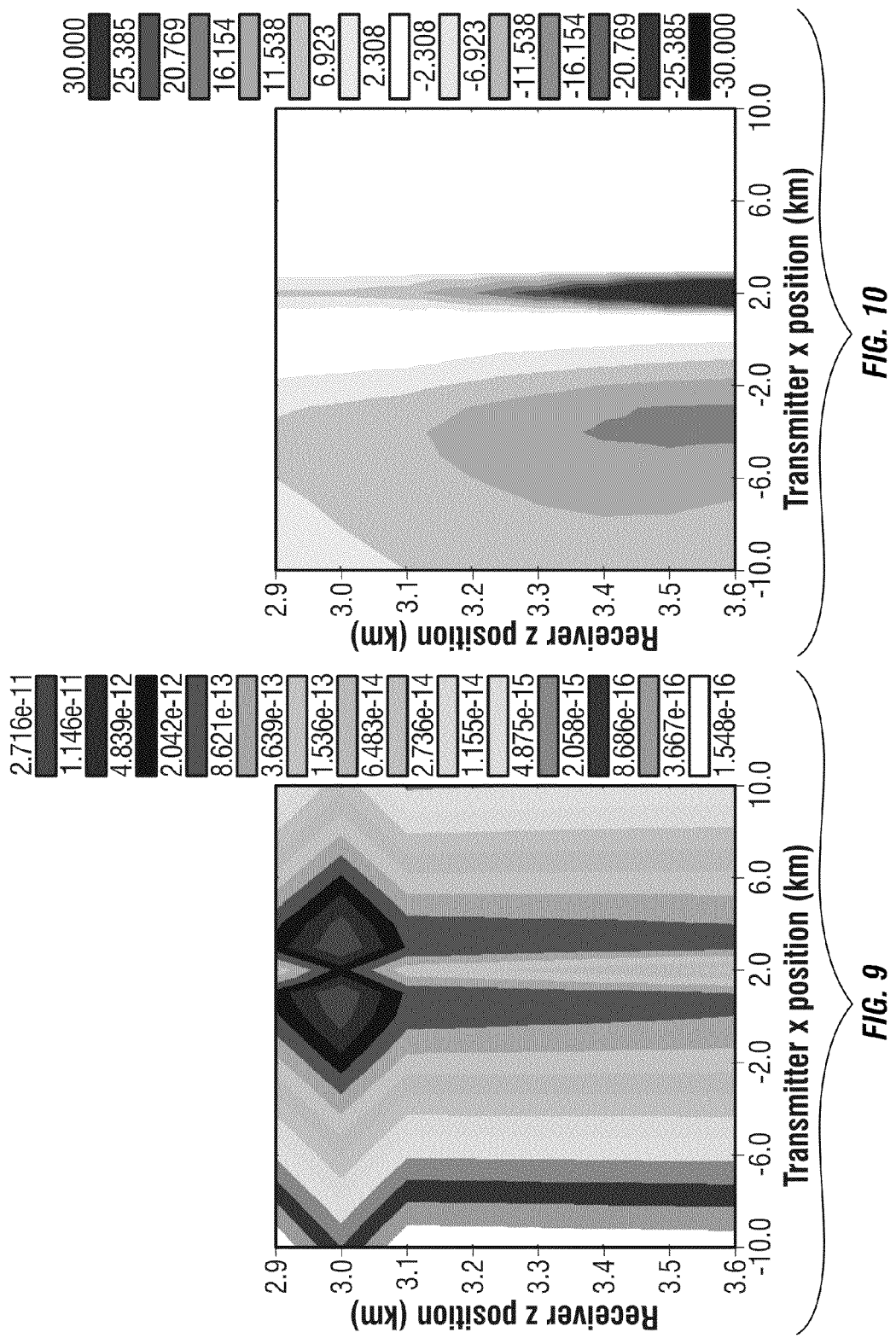
FIG. 9 graphs the amplitude of the 0.25 Hz measured electric field normalized by the source strength and receiver-electrode separation as a function of transmitter depth and receiver position for the configuration of FIG. 8.
FIG. 10 plots the amplitude difference between the two responses for the configuration of FIG. 8.

FIG. 9 shows an example of the type of data that would be collected during such a survey. FIG. 9 plots the amplitude of the 0.25 Hz measured electric field normalized by the source strength and receiver-electrode separation as a function of transmitter depth (vertical axis) and receiver position (horizontal axis). This particular case shows the response without the lower reservoir. FIG. 10 shows the amplitude difference between the two responses with and without the lower reservoir. Note that the amplitude difference between the two scenarios is nearly 20% on the negative side of the borehole, which would be easily identifiable using current borehole interpretation technologies.

Figures 11, 12:
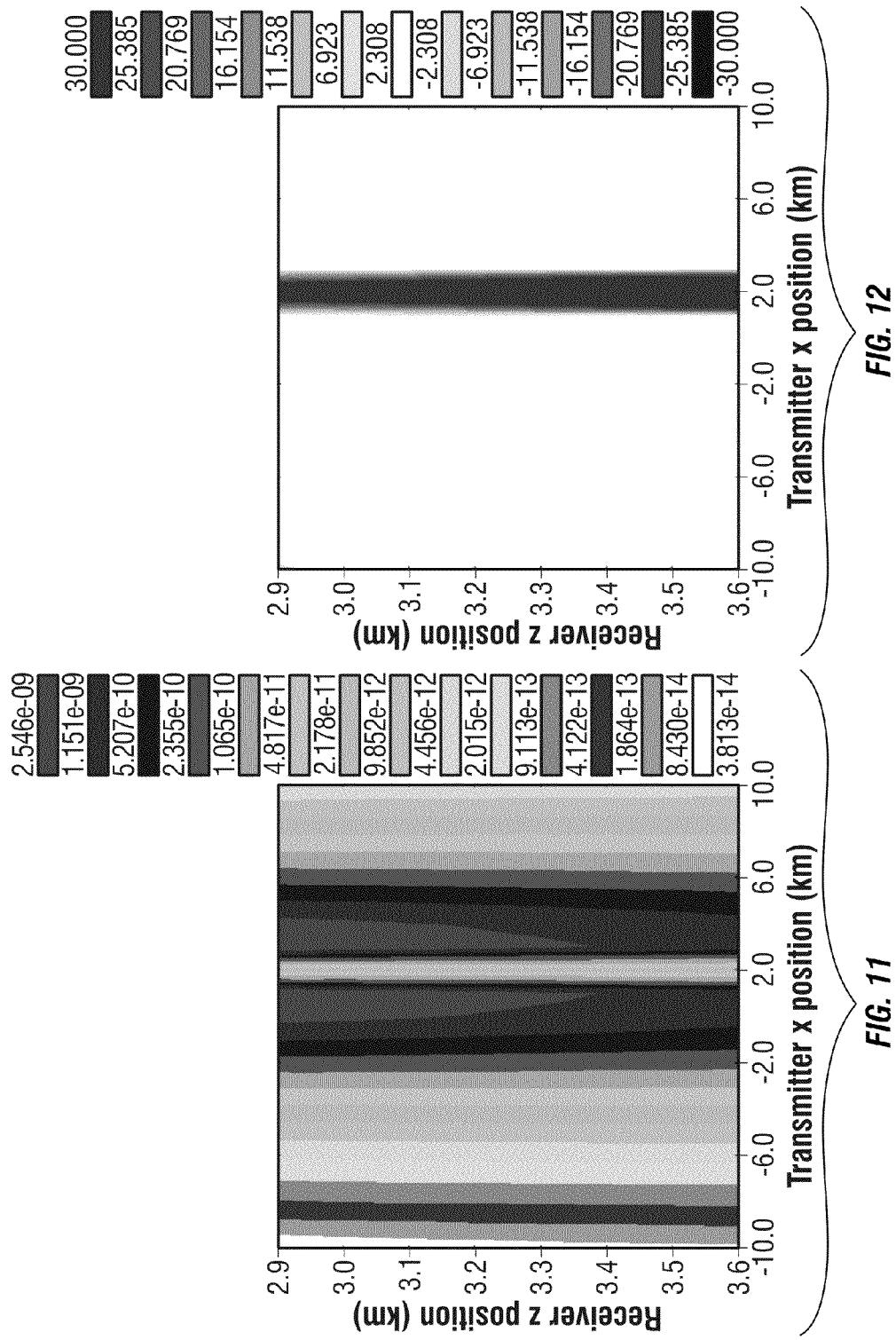
FIG. 11 graphs an example of the magnetic field amplitude in nT for the configuration of FIG. 8.
FIG. 12 plots the difference in responses with and without the stacked reservoir for the configuration of FIG. 8.

To demonstrate that not every type of STB or BTS measurement is sensitive to the lower reservoir, we also have computed the downhole vertical magnetic field response generated by a horizontal electric dipole just above the sea bottom, and oriented perpendicular to the page. FIG. 11 shows an example of the magnetic field amplitude in nT, and FIG. 12 the difference in responses with and without the stacked reservoir. Note that the only differences occur when the source is centered over the well bore at 2000 m, where the signal is very small and difficult to measure (FIG. 11). The fact that there is no response for sources away from the well bore indicates that there is little sensitivity in this particular configuration to the lower reservoir.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A while-drilling method, comprising:
 a) providing an electromagnetic (EM) field source at an Earth surface location;
 b) providing a near-bit electromagnetic (EM) field receiver on a drill string in a borehole at a location proximate a drill bit;
 c) generating an electromagnetic (EM) field at the source;
 d) during drilling of the borehole, measuring a plurality of components of the EM field at the near-bit receiver;
 e) during drilling of the borehole, analyzing in real-time the measured components of the EM field as representative of a distance between the drill bit and a formation anomaly located ahead of the drill bit, the formation anomaly comprising a salt entrance; and
 f) adjusting at least one drilling parameter based on the measured components of the EM field prior to the drill bit reaching the formation anomaly.

2. The method according to claim 1, comprising outputting an estimate of the distance between the drill bit and the formation anomaly located ahead of the drill bit.

3. The method according to claim 1, comprising performing steps c), d), and e) substantially simultaneously with rotation of the drill string.

4. The method according to claim 1, comprising performing steps c), d) and e) substantially simultaneously with a momentarily halt in rotation of the drill string.

5. The method according to claim 1, wherein the measuring the plurality of components of the electromagnetic field at the receiver comprises measuring said component for a plurality of depths.

6. The method according to claim 1, wherein the measuring the plurality of components of the EM field at the near-bit receiver comprises measuring voltage between a pair of electrodes.

7. The method according to claim 1, wherein the measuring the plurality of components of the EM field at the near-bit receiver comprises measuring currents between a plurality of metal plates.

8. The method according to claim 1, wherein the measuring the plurality of components of the EM field at the near-bit receiver comprises measuring a voltage induced in a toroidal coil.

9. The method according to claim 1, wherein the measuring the plurality of components of the EM field at the near-bit receiver comprises measuring current induced in an induction coil or fluxgate magnetometer.

10. The method according to claim 1, wherein the measuring measuring the plurality of components of the EM field at the near-bit receiver comprises measuring the magnetic component of the EM field with a total field magnetometer.

11. The method according to claim 1, wherein the analyzing in real-time comprises deriving the distance as a function of how quickly the measured field changes relative to depth based on a model.

12. The method according to claim 1, wherein the analyzing in real-time comprises deriving the distance based on model matching with a model derived from survey data comprising one or more selected from the group of seismic survey data, controlled source electromagnetic (CSEM) survey data and magnetotelluric (MT) survey data.

13. The method according to claim 12, wherein the model comprises a 2D model or a 3D model.

14. The method according to claim 12, wherein the survey data comprises data collected in a while-drilling survey or a pre-drilling survey.

15. The method according to claim 1, wherein the analyzing in real-time comprises deriving the distance based on a data inversion to iteratively solve for an EM property model.

16. The method according to claim 15, wherein the data inversion is based on a pixel based approach.

17. The method according to claim 15, wherein the data inversion is based on a sharp boundary approach.

18. The method according to claim 1, wherein the analyzing in real-time comprises deriving the distance based on an approximate imaging technique.

19. A while-drilling method, comprising:
   g) providing an electromagnetic (EM) field receiver at an Earth surface location;
   h) providing a near-bit electromagnetic (EM) field source on a drill string in a borehole at a location proximate a drill bit;
   i) generating an electromagnetic (EM) field at the near-bit source;
   j) during drilling of the borehole, measuring a plurality of components of the EM field at the receiver;
   k) during drilling of the borehole, analyzing in real-time the measured components of the EM field as representative of a distance between the drill bit and a formation anomaly located ahead of the drill bit, the formation anomaly comprising a salt entrance; and
   l) adjusting at least one drilling parameter based on the measured components of the EM field prior to the drill bit reaching the formation anomaly.

20. The method according to claim 19, comprising outputting an estimate of the distance between the drill bit and the formation anomaly located ahead of the drill bit.

21. The method according to claim 19, comprising performing steps c), d), and e) substantially simultaneously with rotation of the drill string.

22. The method according to claim 19, comprising performing steps c), d) and e) substantially simultaneously with a momentarily halt in rotation of the drill string.

23. The method according to claim 19, wherein the measuring the plurality of components of the electromagnetic field at the receiver comprises measuring said component for a plurality of depth locations for the near-bit source.

24. The method according to claim 19, wherein the measuring plurality of components of the EM field at the receiver comprises measuring voltage between a pair of electrodes.

25. The method according to claim 19, wherein the measuring plurality of components of the EM field at the receiver comprises measuring currents between a plurality of metal plates.

26. The method according to claim 19, wherein the measuring plurality of components of the EM field at the receiver comprises measuring a voltage induced in a toroidal coil.

27. The method according to claim 19, wherein the measuring plurality of components of the EM field at the receiver comprises measuring current induced in an induction coil or fluxgate magnetometer.

28. The method according to claim 19, wherein the measuring plurality of components of the EM field at the receiver comprises measuring the magnetic component of the EM field with a total field magnetometer.

29. The method according to claim 19, wherein the analyzing in real-time comprises deriving the distance as a function of how quickly the measured field changes relative to depth based on a model.

30. The method according to claim 19, wherein the analyzing in real-time comprises deriving the distance based on model matching with a model derived from survey data comprising one or more selected from the group of seismic survey data, controlled source electromagnetic (CSEM) survey data and magnetotelluric (MT) survey data.

31. The method according to claim 30, wherein the model comprises a 2D model or a 3D model.

32. The method according to claim 30, wherein the survey data comprises data collected in a while-drilling survey or a pre-drilling survey.

33. The method according to claim 19, wherein the analyzing in real-time comprises deriving the distance based on a data inversion to iteratively solve for an EM property model.

34. The method according to claim 33, wherein the data inversion is based on a pixel based approach.

35. The method according to claim 33, wherein the data inversion is based on a sharp boundary approach.

36. The method according to claim 19, wherein the analyzing in real-time comprises deriving the distance based on an approximate imaging technique.

* * * * *